UNITED STATES PATENT OFFICE.

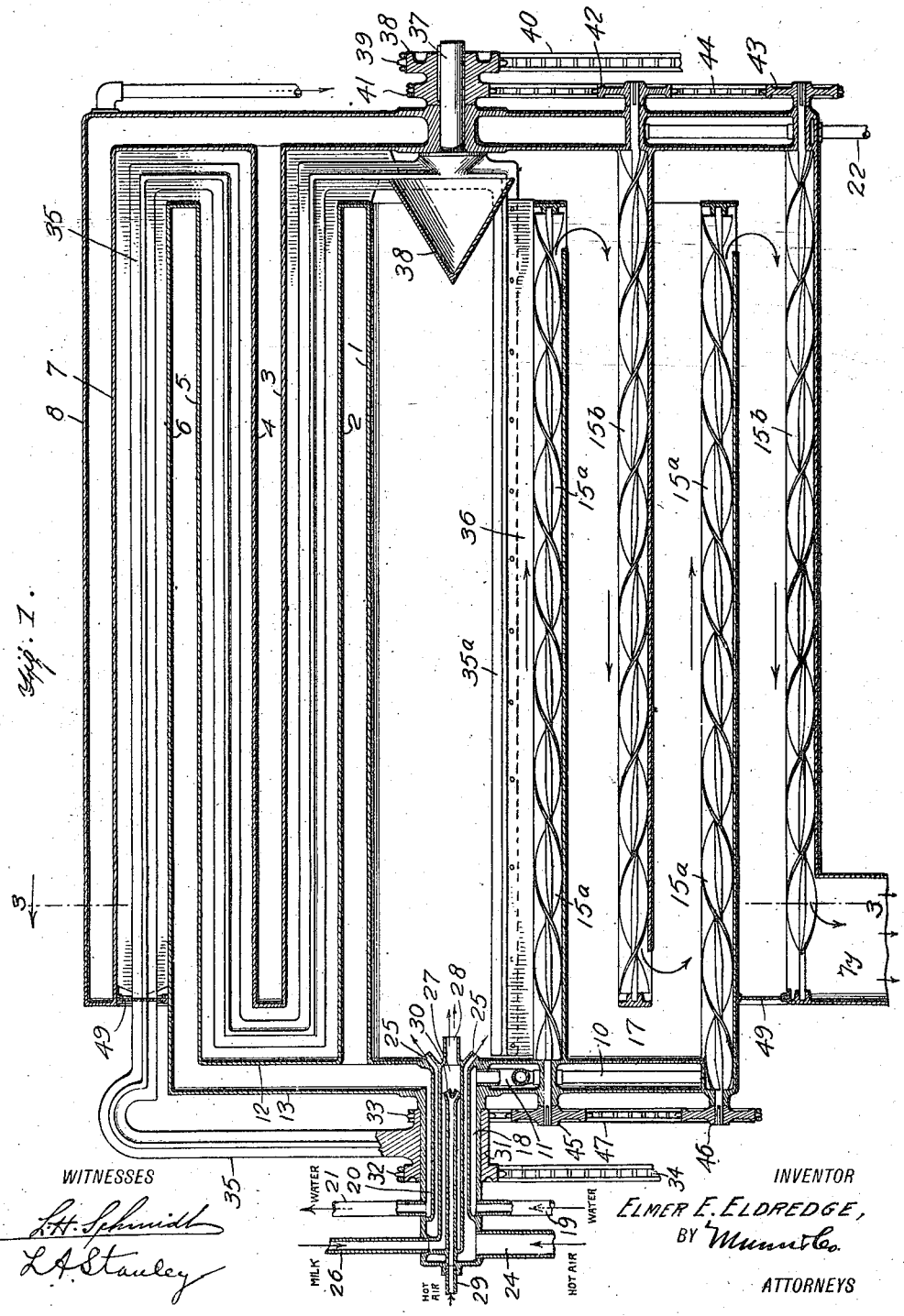

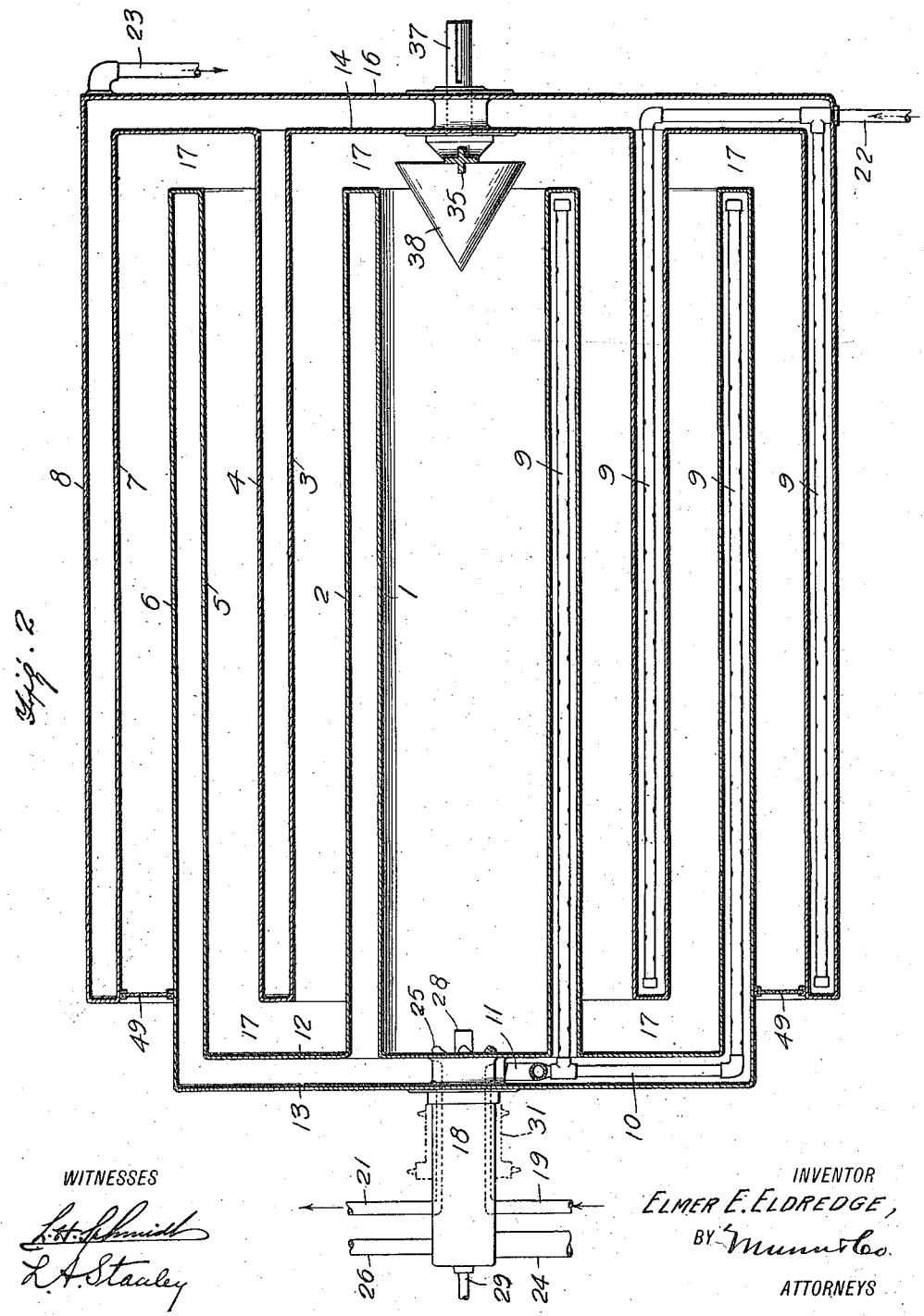

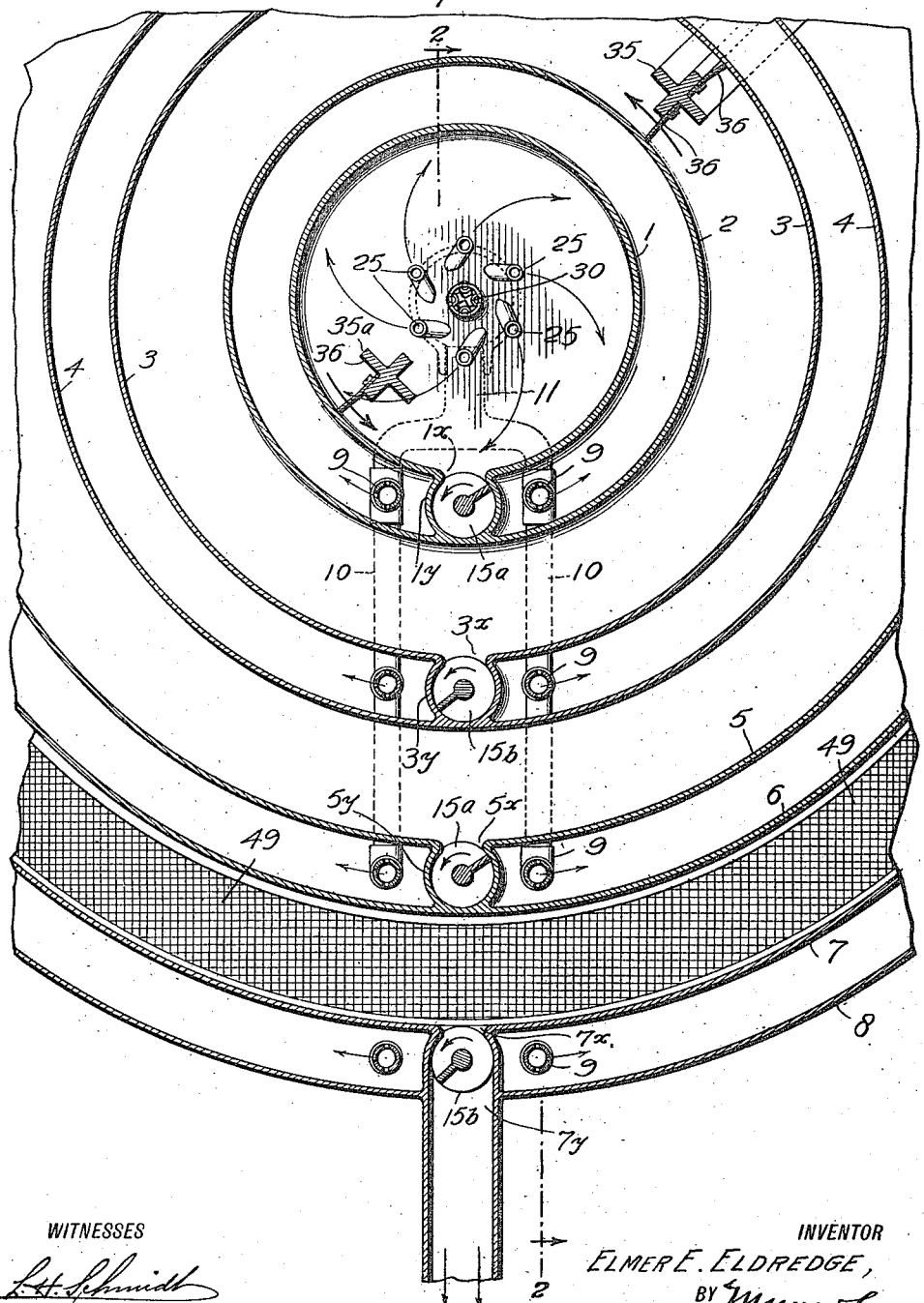

ELMER E. ELDREDGE, OF CHEVY CHASE, DISTRICT OF COLUMBIA.

DESICCATING APPARATUS.

1,134,731. Specification of Letters Patent. Patented Apr. 6, 1915.

Application filed April 11, 1914. Serial No. 831,270.

*To all whom it may concern:*

Be it known that I, ELMER E. ELDREDGE, a citizen of the United States, and a resident of Chevy Chase, in the District of Columbia, have made certain new and useful Improvements in a Desiccating Apparatus, of which the following is a specification.

My invention relates to improvements in desiccating apparatus, and it consists in the combinations, constructions and arrangements herein described and claimed.

An object of my invention is to provide a device by means of which milk or other similar fluids may be economically and effectually dried.

A further object of my invention is to provide means for drying milk which will do away with complicated apparatus and which can be run continuously thereby obviating the necessity of frequent delays for charging or discharging.

A further object of my invention is to provide an apparatus and means for effectually heating the same during the desiccating operation.

Other objects and advantages will appear in the following specification, and the novel features of the invention will be particularly pointed out in the appended claims.

My invention is illustrated in the accompanying drawings forming part of this application in which, Figure 1 is a central vertical section through the device, Fig. 2 is a vertical section along the line 2—2 of Fig. 3, and Fig. 3 is a section along the line 3—3 of Fig. 1.

In carrying out my invention I provide a series of concentric double walled cylinders. In Fig. 3 the inner wall of the inner cylinder is shown at 1, the outer wall being shown at 2. The inner and outer walls of the adjacent cylinder are shown at 3 and 4 respectively, of the next outer cylinder at 5 and 6 respectively, and of the outside cylinder at 7 and 8 respectively. It will be noted from this figure that the outer walls of the cylinders are continuous, while the inner walls are provided with openings such as those shown at $1^x$, $3^x$, $5^x$ and $7^x$ in the bottoms of the cylinders which lead into cylindrical conduits formed integrally with the walls, these conduits being shown in Fig. 3 at $1^y$, $3^y$ and $5^y$ respectively, while the lowermost cylinder is provided with a discharge conduit $7^y$.

Disposed within each of the conduits is a screw conveyer like those shown at $15^a$ and $15^b$. On each side of the conduits containing the screw conveyers and between the inner and outer walls of each of the cylinders are perforated pipes, such as those shown at 9. These pipes are connected together by means of intake pipes 10 communicating with a common inlet pipe 11.

Referring now particularly to Fig. 2 it will be seen that the inner cylinder having the double walls 1 and 2 and the alternate cylinder having the double walls 5 and 6 are connected at one end to a head having the walls 12 and 13 respectively, while the outer cylinder having the walls 7 and 8 and the alternate cylinder having the walls 3 and 4 are connected to a head at the opposite end of the device having the walls 14 and 16 respectively. The ends of the cylinders attached to one of the double walled heads terminate short of the other head, thereby providing passages, such as those shown at 17, permitting a flow from one cylinder into the adjacent cylinder.

Referring now particularly to Fig. 1 it will be seen that I have provided a nozzle of particular shape for injecting the fluid to be desiccated within the inner cylinder. This nozzle as will be seen from Fig. 1 has a lower water chamber 18 which communicates by means of the pipes 11 with the inlet pipes 10 leading to the distributing pipes 9. An inlet pipe 19 permits water to flow into the chamber 18 and thence through the pipes 11 and 10 into the distributing pipes.

The upper part of the nozzle contains a water chamber 20 having a discharge pipe 21 connected therewith at one end, and communicating directly with the space between the walls 12 and 13 of one of the heads, at the other end. From this construction it will be apparent that hot water entering the pipe 19 and passing through the chamber 18, pipe 11 and through the distributing pipes to the water space between the inner and outer walls of the cylinders which are connected to the head through which the nozzle extends, will rise to the upper side of the cylinders and then flow out through the chamber 20 and outlet 21.

In order to provide means for introducing water into the hollow walls of the other two cylinders I make use of an inlet pipe 22, see Fig. 2, which communicates with laterally extending pipes 9 similar to the pipes 9 already described. In this instance the water passed upwardly and flows out through a discharge pipe 23. The cylinders may thus be kept at any desirable temperature by means of the hot water which circulates through the hollow walls.

Referring again to Fig. 1 it will be seen that a pipe 24 for conveying hot air communicates with the inlets 25 leading into the interior of the innermost cylinder. These inlets 25, as shown in Fig. 3, are curved so as to cause a whirling motion of the air as it enters the inner cylinder in the direction shown by the arrows.

The milk is brought in from an inlet pipe 26 through an inner tube 27, being ejected at the discharge opening 28. A second hot air pipe 29 passes through the center of the pipe 27 and is provided with inlet tubes 30 which are curved in the opposite direction from the inlet tubes 25, see Fig. 3. The effect of the oppositely curved inlets is to give the milk which is kept up by the hot air coming through the pipe 29 a rotary movement as it passes from the opening 28 in one direction, while the hot air coming up through the inlets 25 is rotated in the opposite direction.

Rotatably disposed on the exterior portion of the nozzle is a sleeve 31 bearing the sprocket wheels 32 and 33. The former is provided with a drive chain 34 for rotating the sleeve. The sleeve bears an arm 35 which is bent laterally to extend between the outer cylinder and adjacent one, as shown in Fig. 1, is then bent laterally and has a return portion which extends between the next two cylinders, is bent again, as shown in Fig. 1, and terminates in a portion 35ª which extends into the interior of the inner cylinder. This is provided with a scraper 36 whose edge is in contact with the inner wall of the inner cylinder.

The intermediate portions of the arm 35 are provided with similar scrapers 36, see Fig. 3, which are arranged to engage the outer wall of one cylinder and the inner wall of the adjacent concentric cylinder. It will be seen that by rotating the arm 35 the walls between the cylinders will be scraped of any matter which adheres thereto.

The arm 35 is provided with a shaft 37 which extends through the head opposite the nozzle. It is also provided with a deflector 38 of conical shape, as shown in Fig. 1, the apex of the conical deflector being in the common axis of the cylinders. The axis of the shaft 37 is also the axis of the concentric cylinders, so that when the arm 35 is revolved it is supported in its revolution by the shaft 37. The latter bears a hub or sleeve 38 which carries a sprocket wheel 39 arranged to be driven by a chain 40 and a second sprocket wheel 41.

The sprocket wheel 41 is connected with sprockets 42 and 43 on the axes of the conveyers 15ᵇ, by means of a chain 44, while the sprocket wheels 45 and 46 are connected with the sprocket wheel 33 by means of the chain 47 for driving the conveyers 15ª. A screen 49 is mounted for rotation between the outermost cylinder and the adjacent one and this screen is secured to the arm 35 so that as the latter revolves the screen is carried with it.

From the foregoing description of the various parts of the device the operation thereof may be readily understood. As the milk is admitted through the nozzle it is given a whirling motion by means of the hot air which comes through the inlet 30, while the hot air coming through the inlet 25 tends to rotate in the opposite direction. The milk is ejected into the inner cylinder in the form of a fine atomized spray, and coming into contact with the heat and heated walls of the cylinder is rapidly dried. The current of air passes the length of the inner cylinder and is deflected by the deflector 38 and caused to pass between the walls of the inner cylinder and the adjacent cylinder, and thence back and forth between the various cylinders, finally emerging through the screen 49. It will be noted that this construction provides for a longer course for the milk to travel within a comparatively restricted space, this course being heated by the proximity of the heated walls of the cylinders.

The milk is desiccated or fully dried before it reaches the screen and is deposited upon the walls of the cylinders so that the air alone emerges at the screen 49. The rotation of the arm 35 with the scrapers attached thereto causes the dried matter which has accumulated on the walls to be scraped therefrom and to be brought around into position where it enters the openings in the bottom of the cylinders into the conveyer pipes. Here it is conveyed by the rotation of the conveyer screws to the ends of the conveyer pipe sections where it is deposited upon the next outer cylinder. Thus the desiccated milk is passed along until finally it reaches the discharge conduit 7ʸ.

It will be seen that the action of this device is continuous, since the flow of milk and air can be so gaged that only air will be forced out of the machine through the screen while the scrapers and conveyers take care of the dried or desiccated milk which the machine produces.

The main purpose of the screen 49 is to prevent the discharge of any of the desiccated matter, while permitting the discharge of the heated air. It is possible of course to vary the temperature of the cylinders by varying the rate of flow of the water, or the temperature of the water.

I claim:—

1. A desiccating apparatus comprising a series of concentric cylinders spaced apart, the spaces between adjacent cylinders being in communication, means for injecting an atomized fluid to be desiccated, into the interior of the inner cylinder, and means for causing the travel of the fluid between the walls of the concentric cylinders.

2. A desiccating apparatus comprising a series of concentric cylinders spaced apart, the spaces between adjacent cylinders being in communication, means for injecting an atomized fluid to be desiccated, into the interior of the inner cylinder, means for causing the travel of the fluid between the walls of the concentric cylinders, and means for scraping the desiccated matter from the walls of the cylinders.

3. A desiccating apparatus comprising a series of concentric cylinders spaced apart, the spaces between adjacent cylinders being in communication, means for injecting an atomized fluid to be desiccated, into the interior of the inner cylinder, means for causing the travel of the fluid between the walls of the concentric cylinders, means for scraping the desiccated matter from the walls of the cylinders, and means for removing the desiccated matter from the device.

4. A desiccating apparatus comprising a series of concentric cylinders spaced apart, the spaces between adjacent cylinders being in communication, means for injecting an atomized fluid to be desiccated, into the interior of the inner cylinder, means for causing the travel of the fluid between the walls of the concentric cylinders, means for scraping the desiccated matter from the walls of the cylinders, and means for removing the desiccated matter from the device, said last-named means comprising a series of conveyers disposed in the walls of the concentric cylinders.

5. In a desiccating apparatus, a plurality of concentric cylinders, a common head for securing said cylinders together at one end, a second series of cylinders, concentric with the first series, a head for securing said second series of concentric cylinders together, the cylinders of one series alternating with the cylinders of the other series and the ends of the cylinders of each series being spaced apart from the common head of the other series.

6. In a desiccating apparatus, a plurality of concentric cylinders, a common head for securing said cylinders together at one end, a second series of cylinders, concentric with the first series, a head for securing said second series of concentric cylinders together, the cylinders of one series alternating with the cylinders of the other series and the ends of the cylinders of each series being spaced apart from the common head of the other series, and means for heating the cylinders of both series.

7. In a desiccating apparatus, a plurality of concentric cylinders, a common head for securing said cylinders together at one end, a second series of cylinders, concentric with the first series, a head for securing said second series of concentric cylinders together, the cylinders of one series alternating with the cylinders of the other series and the ends of the cylinders of each series being spaced apart from the common head of the other series, means for heating the cylinders of both series, and means for forcing an atomized fluid into the inner cylinder.

8. In a desiccating apparatus, a plurality of concentric cylinders, a common head for securing said cylinders together at one end, a second series of cylinders, concentric with the first series, a head for securing said second series of concentric cylinders together, the cylinders of one series alternating with the cylinders of the other series and the ends of the cylinders of each series being spaced apart from the common head of the other series, means for heating the cylinders of both series, means for forcing an atomized fluid into the inner cylinder, and a scraping device mounted to rotate about the common axis of said concentric cylinders, portions of said scraping device being disposed between the cylinders and other portions of the scraping device being disposed between the ends of the cylinders of one series and the common head of the adjacent series.

9. In a desiccating apparatus, a stationary cylinder having an opening in its inner bottom, a conduit disposed beneath the inner wall of the cylinder and being in communication with said cylinder through said opening, a conveyer disposed within said conduit, means for ejecting an atomized fluid into the cylinder, and a scraper mounted for rotation about the axis of the cylinder for scraping the inner wall of the cylinder.

10. In a desiccating apparatus, a pair of double walled concentric cylinders each having an opening in its bottom, a conduit disposed below the inner wall of each of said cylinders and being in communication with the interior of the cylinder through said opening, a conveyer disposed in each of said conduits, means for injecting an atomized fluid into the inner cylinder, both of said cylinders being in communication with one another, and a scraping device mounted for rotation about the common axis of said concentric cylinders and arranged to engage the outer wall of one of said cylinders and the inner wall of the other cylinder.

11. In a desiccating apparatus, a stationary cylinder having an opening in its bottom, a conduit disposed beneath the inner bottom wall of the cylinder and being in communication with said cylinder through said opening, a conveyer disposed within said conduit, means for ejecting an atomized fluid into the cylinder, and a scraper mounted for rotation about the axis of the cylinder for scraping the inner wall of the cylinder, said scraper being arranged to pass over the opening between the conduit and the interior of the cylinder.

ELMER E. ELDREDGE.

Witnesses:
L. A. STANLEY,
SOLON C. KEMON.